July 19, 1955

F. E. ABERER 2,713,367

KITCHEN SLICING AND SHREDDING MECHANISM
AND LATCHING MECHANISM THEREFOR

Filed April 27, 1953

INVENTOR.
Frank E. Aberer
BY
ATTORNEY.

United States Patent Office 2,713,367
Patented July 19, 1955

2,713,367

KITCHEN SLICING AND SHREDDING MECHANISM AND LATCHING MECHANISM THEREFOR

Frank E. Aberer, Kansas City, Kans., assignor to John C. Hockery, Kansas City, Mo., as trustee Application April 27, 1953, Serial No. 351,249

13 Claims. (Cl. 146—91)

The present invention relates in general to devices for slicing, shredding or grating foods (e. g., vegetables, fruits and cheese) and like materials; it deals more particularly with slicing or shredding devices that employ rotary cutting elements.

The object of the invention, broadly speaking, is to provide a simple, efficient and durable kitchen utensil of the character indicated, which is convenient and easy to use, effective in its operation, easy to clean and maintain sanitary, rugged in construction and reasonably economical to manufacture.

Another object is to provide a simple and efficient slicing and shredding unit having a rotary cutting element that is readily removable from the driving shaft for purposes of cleaning; said element also being interchangeable with others of generally similar construction.

To the latter end, a further object is to provide an improved latching mechanism by which the aforementioned rotary element or elements may be secured to the drive shaft and removed therefrom at will quickly and easily, which mechanism insures against accidental detachment or slippage of the cutting element when same is latched to the shaft and holds it securely and firmly in operating position.

Other and additional objects, together with the features of novelty by which the objects are achieved, will appear in the course of the following description of the invention.

In the accompanying drawings which form a part of the specification and are to be read in conjunction therewith and in which like reference numerals are employed to indicate like parts of the various views.

Figure 2:
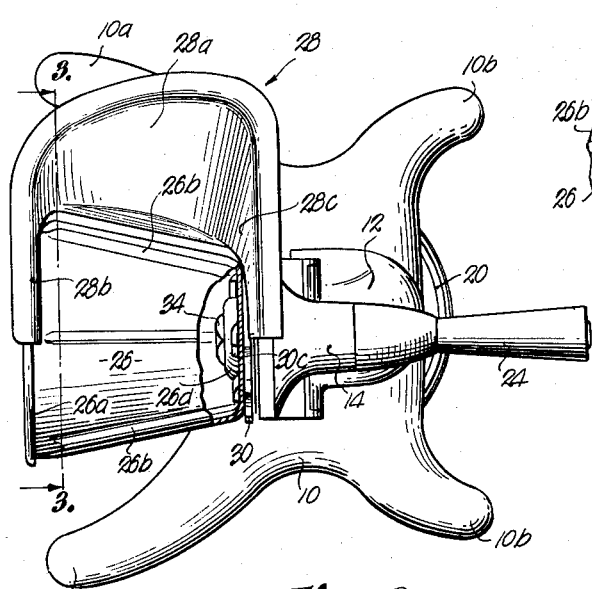
Fig. 2 is a plan view of same, part of the cutting element being broken away for purposes of illustration.

Referring more particularly to the drawings, my food slicer or shredder has a base 10 with an upstanding pedestal 12 carrying a head 14 at its upper end. The base is of irregular shape providing two forwardly extending legs 10a and two rearwardly extending legs 10b as shown in Fig. 2; each of these has at its tip a rubber bushing or foot 16 adapted to rest on the table 18 or other suitable horizontal surface. For the purpose of firmly anchoring the unit to the supporting surface, I prefer to provide it with a suction cup gripping element 20, but this forms no part of the present invention and therefore has not been illustrated in detail.

Figure 1:
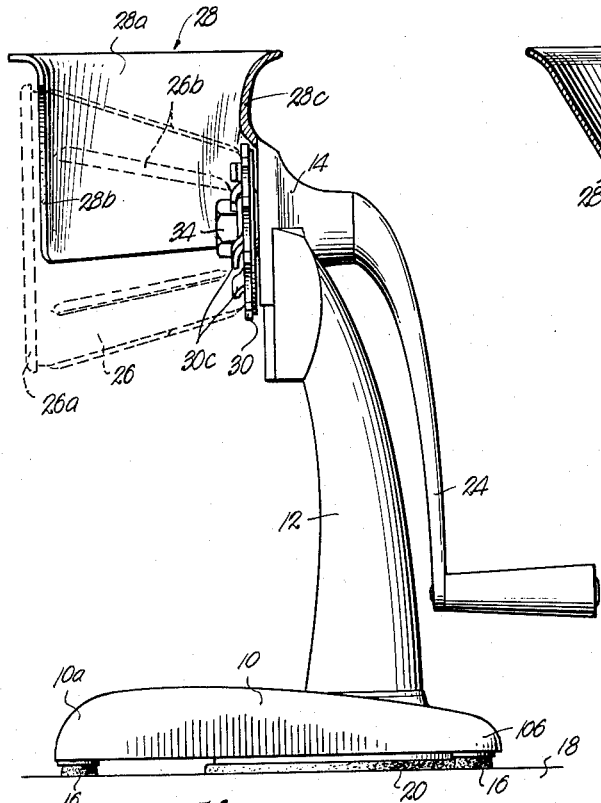
Fig. 1 is a side elevational view of a food slicer and shredder embodying the invention, the removable cutting element being shown in dotted lines.

Journaled in the head 14 is a horizontal shaft 22 having a hand crank 24 secured to one end thereof for manually turning the shaft. As will be explained more in detail presently, a tapered slicing, shredding or grating member 26 is adapted to be connected to the opposite end of the shaft to rotate therewith upon turning of the crank. This member is a hollow truncated cone or cup whose walls converge toward the bottom thereof; in use it is disposed with its axis horizontal so the bottom of the cup is adjacent the head 14, and the rim or mouth 26a opens toward the left as seen in Figs. 1 and 2. Sharpened knife elements 26b are struck out of the wall of the cup forming complementary apertures 26c.

Beside the rotary cup and cooperating with the lateral exterior portion to form an open top hopper (see Figs. 2 and 3) is a stationary chute or guide 28 carried on the head 14. This has an inclined side wall 28a down which vegetables or the like can be fed toward the cup as the latter is rotated; and end walls 28b and 28c which serve to confine the vegetable against movement axially of the cup beyond the ends thereof.

Figure 4:
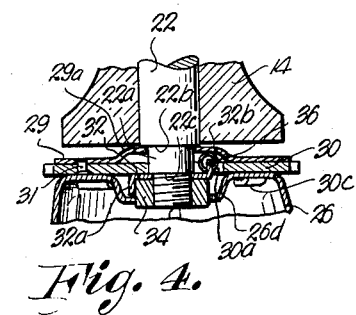
Fig. 4 is an enlarged cross section taken along the line 4—4 of Fig. 3 in the direction of the arrows.

For the purpose of connecting the rotary cup to the shaft to turn therewith, I make use of a latching disk comprising a pair of generally circular plates 29 and 30 secured together by rivets 31. The two plates are centrally apertured and, as shown in Fig. 4, journaled for rotation on a reduced portion 22a of the shaft. As can also be seen in the latter figure, the central portion of the rear plate 29 is dished away from the forward plate, which provides in effect an axially elongated bearing that is effective to stabilize the latching disk unit against wobbling on the shaft. Although free to turn on the shaft, this unit is held against axial movement, being positioned between the shoulder 22b and a washer 32 which in turn is clamped against a second shoulder 22c by a hexagonal nut 34 screwed on the threaded end of the shaft.

Adjacent the central aperture in the forward plate 30, there is a 90° cutout segment which forms with the side of the shaft 22 a circumferentially elongated opening or slot 30a adapted to receive a coiled compression spring 36. The purpose of this spring will be made clear presently, but it may well be noted at this point that the spring is held in the slot by means of the back plate 29, the dished center portion of which covers the rear of the slot; and washer 32 which covers the major portion of the front of the slot.

Figure 3:
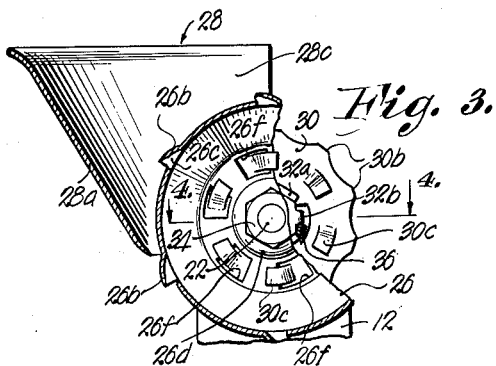
Fig. 3 is a cross-sectional view of the upper portion of the device, taken along the line 3—3 of Fig. 2 in the direction of the arrows.
Figure 5:
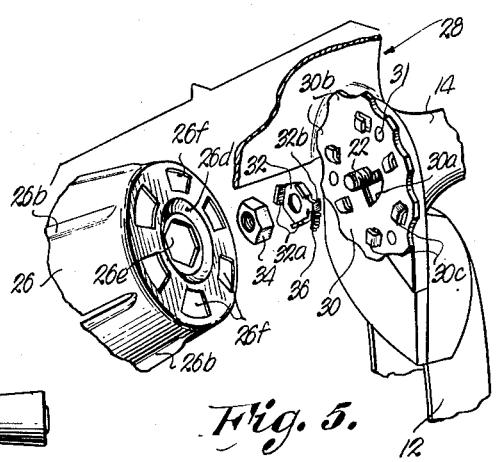
Fig. 5 is an exploded perspective view showing the components of the latching mechanism for the removable cutting element.

As best seen in Fig. 5, the washer has three outwardly projecting lugs 32a which engage three corresponding sides of the nut to prevent relative rotation between the two. This likewise serves to prevent relative rotation between the washer and the shaft when the nut is screwed tightly home. The washer also has a lug 32b projecting inwardly and received in the circumferentially elongated slot 30a in the disk 30. The coiled compression spring 36 is disposed in this slot between the lug and one end of the slot whereby it always biases disk 30 clockwise as seen in Fig. 3. The margin of the disk is scalloped to provide suitable finger receiving elements 30b, however, to facilitate limited manual rotation of the disk counterclockwise against the force of the spring.

The bottom or small end of the rotary cup 26 has a central concavo-convex boss 26d containing a hexagonal aperture 26e adapted to receive and closely embrace the sides of nut 34. Arranged in a circle around the boss are a plurality of equally spaced latch openings 26f. A corresponding series of equally spaced latch lugs or ears 30c struck out of the disk 30 are arranged to pass through the openings and, under the influence of spring 36, advance circumferentially to the position shown in Fig. 3. When in this position, it will be seen that the free end of each latch lug overlies a portion of the bottom of the cup adjacent one of the apertures 26f whereby the bottom of the cup is held firmly seated against the face of disk 30. Stated differently, the latch lugs prevent movement of the cup axially away from the disk 30 and, at the same time, the presence of nut 34 in the hexagonal opening 26e prevents rotation of the cup relative to shaft 22.

The rotary cup thus is firmly supported and also is locked securely to the shaft. In using the device, the cup is turned counterclockwise (as seen in Fig. 3) by means of the hand crank 24. The vegetable or other object to be sliced is pressed downwardly in the space between the exterior of the cup and the sloping wall 28a, causing portions to be shaved off by the cutting elements 26b as the latter travel past the confined vegetable. These shavings or cuttings pass through the apertures 26c to the interior of the cup, and as will be clear from Fig. 1, they then advance toward the open mouth or rim 26a and fall from the cup into a suitable receptacle positioned therebelow. The forward feet 10a of the base are spread apart to permit positioning of a bowl or like receptacle therebetween for this purpose.

It should be observed that upon turning the hand crank 24 to perform the slicing or shredding operation just described, the torque is transmitted from the drive shaft to the tapered cup solely through the hexagonal socket connection which the latter has with the hexagonal nut 34. This direct drive connection between the two by-passes the latching disk 30 and no torque is transmitted through the latch mechanism as such, although disk 30 turns with the cup and keeps the latching lugs 30c engaged so as to support the cup and maintain the aforementioned drive connection between the hexagonal nut and its complementary aperture or socket 26e.

In order to remove cup 26 from the device, it is only necessary to hold crank 24 stationary and manually turn disk 30 very slightly in a counterclockwise direction (Fig. 3) to bring the latch lugs 30c fully within the associated apertures 26f; then the cup can be withdrawn axially from the hexagonal nut. To replace the cup, this procedure is reversed: the cup is advanced axially onto the nut while disk 30 is manually turned counterclockwise against the force of spring 36 so that the lugs 30c will register with and pass through the apertures 26f; then the latching disk is released and spring 36 shifts the lugs 30c into latching position as shown.

Thus, it is very simple to remove the rotary cup for cleaning after it has been used, and equally easy to replace the cup on the unit after cleaning. This feature also makes it a simple matter to substitute for the cup shown another cup of similar construction having identical cutting elements 26b or, alternatively, cutting elements of other configuration. Stated differently, it is contemplated that different rotary cups may be mounted interchangeably on the unit by means of the latching mechanism described, the different cups being identical except for the size and shape of the cutting elements 26b struck out of the cup wall.

From the foregoing, it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. In a device of the character described, a base with an upstanding pedestal, a generally horizontal shaft carried at the upper end of the pedestal, a crank connected to one end of the shaft for turning same, a cup-shaped member having a centrally apertured bottom adapted to be advanced over the other end of the shaft to a position spaced inwardly thereof, latching means engageable with said bottom when the latter is in said position and effective when so engaged to restrain said cup against movement axially of the shaft, other means effective when said member is in said position to form a direct torque connection between said shaft and said bottom whereby torque is transmitted from the shaft to the member independently of said latching means, and said latching means being disengageable from said member at will to permit the latter to be withdrawn axially from the shaft.

2. A device as in claim 1 wherein said latching means includes a disk rotatable relative to said shaft and about the same axis, and cooperating latch elements on said disk and bottom respectively, positioned to engage upon predetermined rotation of the disk relative to the member.

3. In a device of the character described, a rotary drive shaft, a centrally apertured member adapted to be advanced axially over one end of said shaft to a position spaced inwardly from the end, latching means on said shaft engageable with said member when the latter is in said position and effective when so engaged to restrain the member against movement axially of the shaft, other means effective when said membr is in said position to form a direct torque connection between said shaft and said member whereby torque is transmitted from the shaft to the member independently of said latching means, and said latching means being disengageable from said member at will to permit the latter to be withdrawn axially from said shaft.

4. A device as in claim 3 wherein said latching means includes a disk rotatable relative to said shaft and about the same axis, and cooperating latch elements on said disk and member respectively, positioned to engage with one another upon predetermined rotation of the disk relative to the member.

5. A device as in claim 4 having stop means limiting the rotation of said disk relative to the said shaft to less than one full revolution.

6. A device as in claim 5 having spring means between said shaft and disk biasing the latter in a direction to cause engagement of said cooperating elements.

7. In a device of the character described, a support, a driving rotor journaled in said support with one end projecting beyond the support, said end being non-circular, a member to be driven, said member having a central aperture of a shape complementary to that of said end thereby to permit the member to be advanced axially over the end of the rotor to a position spaced inwardly thereof, latching means engageable with said member when same is in said position and effective when thus engaged to restrain the member against movement axially of the rotor, said non-circular rotor end and complementary aperture forming a direct torque connection between the rotor and member whereby torque is transmitted from the rotor to the member independently of said latching means, and said latching means being disengagable from said member at will to permit the latter to be withdrawn axially from said rotor.

8. A device as in claim 7 wherein said latching means includes a disk rotatable relative to said rotor and about the same axis, and cooperating latch elements on said disk and member, respectively, positioned to engage one another upon predetermined rotation of the disk relative to the member.

9. A device as in claim 8 having spring means between said rotor and disk always biasing the latter in a direction to engage said latch elements.

10. In a device of the character described, a rotory driving member and a rotary driven member coaxial therewith, one of said members containing a non-circular socket and the other member having a complementary non-circular stub received in said socket for transmitting torque from the driving member to the driven member, a disk coaxial with the driving member and positioned adjacent the driven member, means restraining said disk from movement axially of said driving member while allowing limited rotary movement of the disk relative to said driving member, cooperating latch elements on said driven member and said disk respectively normally engaged with one another to maintain said stub in said socket but adapted to disengage upon rotation of the disk in a predetermined direction relative to said driving and driven members, and spring means between said driving member and said disk always biasing said disk in a direction opposite said predetermined direction.

11. In a device of the character described, a support, a driving rotor journalled in said support with one end projecting beyond the support, said end being non-circular, a member to be driven, said member having a central aperture of a shape complementary to that of said end thereby to permit the member to be advanced axially over the end of the rotor to a position spaced inwardly thereof, a disk mounted on said rotor to turn relative thereto about the same axis, cooperating latch elements on said disk and member, respectively, positioned to engage with one another upon rotation of the disk in a predetermined direction relative to said member when the latter is in said position and effective when thus engaged to restrain the member against movement axially of the rotor, said non-circular rotor and complementary aperture forming a direct torque connection between the rotor and member, whereby torque is transmitted from the rotor to the member independently of said disk, and said latch elements being disengagable upon rotation of said disk in a direction opposite said predetermined direction, thereby to permit said member to be withdrawn axially from said rotor.

12. A device as in claim 11 having spring means between said rotor and disk, always biasing the latter in said predetermined direction, thereby to normally maintain said latch element in engagement.

13. A slicing or the like device for foods comprising a suitable support, a shaft journalled in said support, a slicing or the like means, said shaft having on one end thereof a power applying means for engaging and rotating said slicing or the like means, one of said means having an eccentric stub and the other having a complementary socket for receiving said stub, a latch-bearing disk journalled on said shaft for relative rotation therewith and positioned adjacent said means and having at least one latch thereon for engagement with said slicing or the like means for holding the latter for engagement with said power applying means.

References Cited in the file of this patent

UNITED STATES PATENTS

| | | |
|---|---|---|
| 939,951 | Myers et al. | Nov. 9, 1909 |
| 1,114,411 | Stuver | Oct. 20, 1914 |
| 1,444,975 | Maine | Feb. 13, 1923 |
| 1,538,609 | Barnett | May 19, 1925 |
| 1,997,413 | Fitzgerald | Apr. 9, 1935 |